(12) United States Patent
Verma

(10) Patent No.: US 11,805,412 B2
(45) Date of Patent: Oct. 31, 2023

(54) SYSTEMS AND METHODS FOR OBTAINING AN ELECTRONIC IDENTIFICATION OF A USER EQUIPMENT FOR ACTIVATION OF A SUBSCRIPTION

(71) Applicant: Verizon Patent and Licensing Inc., Basking Ridge, NJ (US)

(72) Inventor: Tarun Verma, Flemington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/660,068

(22) Filed: Apr. 21, 2022

(65) Prior Publication Data

US 2022/0248224 A1    Aug. 4, 2022

Related U.S. Application Data

(63) Continuation of application No. 17/101,860, filed on Nov. 23, 2020, now Pat. No. 11,323,877.

(51) Int. Cl.
*H04W 8/18* (2009.01)
*H04W 8/20* (2009.01)
*H04W 12/06* (2021.01)
*H04W 12/30* (2021.01)

(52) U.S. Cl.
CPC .......... *H04W 12/06* (2013.01); *H04W 8/183* (2013.01); *H04W 8/205* (2013.01); *H04W 12/35* (2021.01)

(58) Field of Classification Search
None
See application file for complete search history.

(56) References Cited

U.S. PATENT DOCUMENTS

| 11,172,350 | B1 * | 11/2021 | Chaugule ............ H04M 17/103 |
| 2011/0312301 | A1 | 12/2011 | Muller et al. |
| 2019/0324735 | A1 | 10/2019 | Park |
| 2019/0373448 | A1 | 12/2019 | Gao |
| 2021/0076204 | A1 | 3/2021 | Goyal et al. |

FOREIGN PATENT DOCUMENTS

EP    3185599    6/2017

* cited by examiner

*Primary Examiner* — Gary Lafontant

(57) ABSTRACT

In some implementations, a user equipment may provide an authentication request, including a detection code associated with a subscriber identification and an authentication identifier, to a subscription manager. The user equipment may receive, via a mobile network operator, an authentication response that includes an embedded universal integrated circuit card (eUICC) identifier (EID) based on providing the authentication request. The user equipment may generate, based on an activation code generated based on the authentication response, an activation request that includes the EID. The user equipment may provide the activation request to activate a wireless communication service that is provided by the mobile network operator.

20 Claims, 5 Drawing Sheets

SYSTEMS AND METHODS FOR OBTAINING AN ELECTRONIC IDENTIFICATION OF A USER EQUIPMENT FOR ACTIVATION OF A SUBSCRIPTION

RELATED APPLICATION

This application is a continuation of U.S. patent application Ser. No. 17/101,860, entitled "SYSTEMS AND METHODS FOR OBTAINING AN ELECTRONIC IDENTIFICATION OF A USER EQUIPMENT FOR ACTIVATION OF A SUBSCRIPTION," filed Nov. 23, 2020, which is incorporated herein by reference in its entirety.

BACKGROUND

Remote subscriber identity module (SIM) provisioning may be used to remotely activate a SIM embedded in a device. Such an embedded SIM (eSIM) may be used to remotely manage one or more mobile network operator (MNO) subscriptions for the device. The eSIM may comprise an embedded universal integrated circuit card (eUICC), which may provide a secure hardware element personalizable to a particular MNO using a binary SIM. The binary SIM may include a set of credentials for the eUICC to use when operating using the particular MNO.

DETAILED DESCRIPTION OF PREFERRED EMBODIMENTS

Figure 1A:
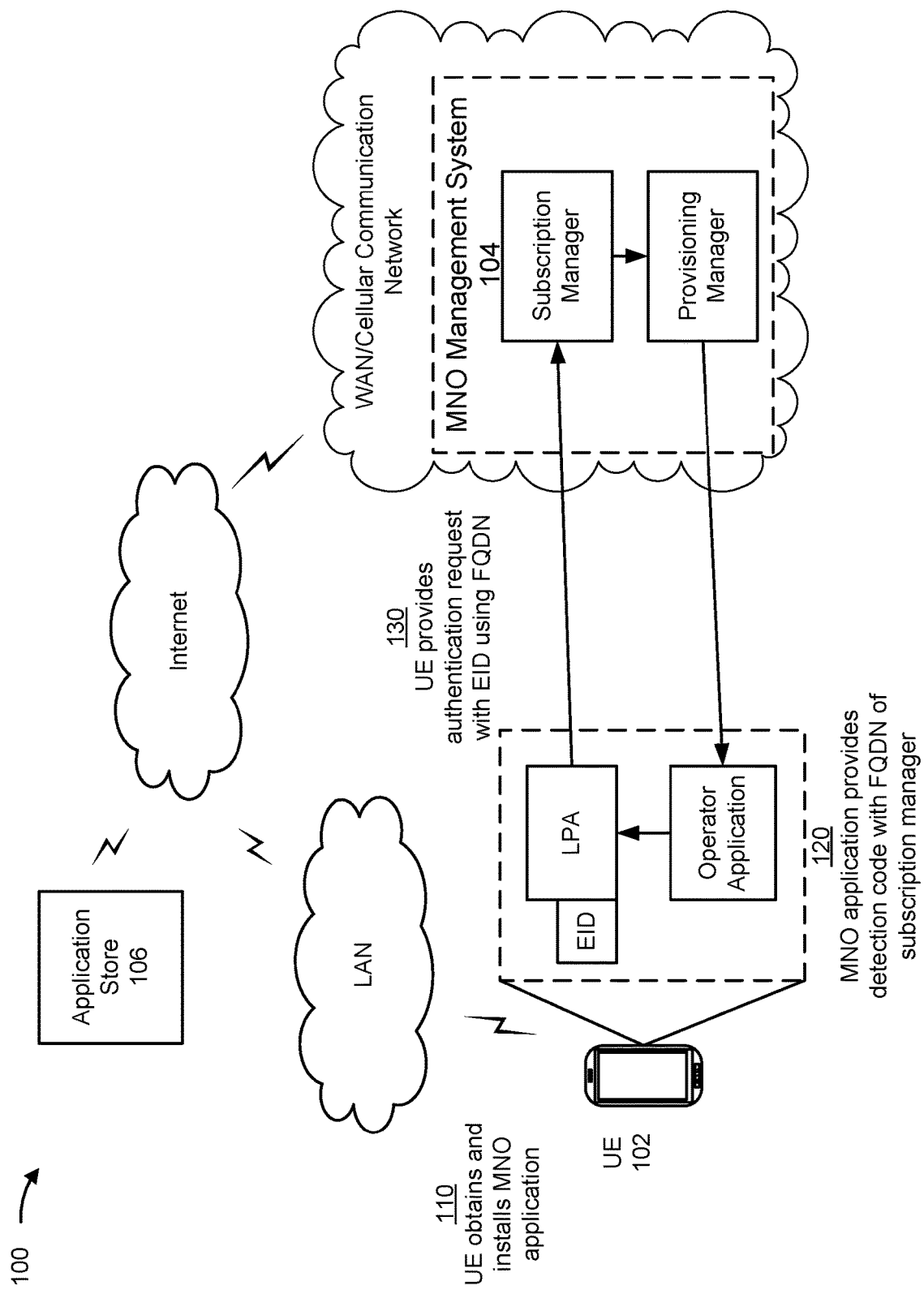
FIGS. 1A-1B are diagrams of an example associated with obtaining an electronic identification of a user equipment for activation of a subscription.

The following detailed description of example implementations refers to the accompanying drawings. The same reference numbers in different drawings may identify the same or similar elements.

An embedded universal integrated circuit card (eUICC) may be embedded in a user equipment (UE), such as a mobile phone, a vehicle (e.g., a car, a truck, a boat, and/or the like), an appliance, an electronic device (e.g., a security system, a thermostat, and/or the like), an Internet of Things (IoT) device (e.g., an IoT device or other device that supports a consumer subscription management architecture), and/or the like, and may store one or more subscriber identity module (SIM) profiles that permit access to one or more corresponding mobile network operator (MNO) networks (e.g., cellular networks) at different times (e.g., where only one SIM profile can be enabled at a time). The SIM profiles may be remotely managed using remote SIM provisioning to install, enable, disable, and/or delete SIM profiles from the eUICC. For example, remote SIM provisioning may be used when a device with an eUICC changes ownership, when a subscription associated with the device changes, when a user switches to a different MNO, and/or the like. In these cases, a new SIM profile may need to be downloaded, installed, and enabled on the eUICC, which may be time consuming.

As an example, a user (e.g., an owner, a lessee, a renter, a driver, a passenger, and/or the like) of a vehicle may change, such as when the vehicle is bought, sold, leased to a different person, rented to a different person, and/or the like. In such cases, the new user may subscribe with an MNO and start the vehicle to cause a new SIM profile, associated with the new user, to be downloaded from a remote SIM provisioning system, installed on the eUICC, and enabled to permit the new user to use wireless network services, such as calling, messaging, setting up a wireless local area network (WLAN) hotspot, and/or the like.

In such cases, a third party mobile application operating on a UE, such as a MNO self-serve application (or "MNO application") may obtain a device serial number, such as an eUICC identifier (EID), an international mobile equipment identity (IMEI), or an international mobile subscriber identity (IMSI), among other examples, and use the device serial number to perform on-device activation (ODA) of the eUICC-capable UE. The EID may uniquely identify the eUICC of the UE. As the eUICC may be permanently attached to the UE (e.g., soldered to other electronic components of the UE), the eUICC also uniquely identifies the device. Using the EID, the MNO application may identify a device type (e.g., a make of the UE, a model of the UE, or a stock-keeping unit (SKU) of the UE) via an internal lookup and identify a corresponding eSIM for the UE (e.g., a SKU of the eSIM). By identifying the corresponding eSIM, the MNO application may determine an integrated circuit card identifier (ICCID) of the eSIM, and use the ICCID for personalization procedures (e.g., a subscription manager (SM) data preparation (DP) combined (SM-DP+) component of the eSIM and ICCID) and provisioning procedures (e.g., network elements component of the eSIM and ICCID). As a result of the personalization and provisioning procedures, the MNO application may download an eSIM binary to the UE from the MNO's SM-DP+ and activate the eSIM for the UE, thereby enabling the UE to access network services provided by the MNO.

However, some UEs do not permit third party mobile applications to obtain a device serial number or other device information that may be used in ODA procedures. As a result, on such UEs, a user may need to manually navigate into a settings application of the UE to identify a serial number of the UE, copy the serial number, and provide the serial number into the MNO application. This procedure may result in a delay in obtaining network service as well as result in excess utilization of device resources (e.g., processing resources or power resources) while a user navigates through multiple menus to find the serial number and possibly network resources while the UE is used to search the Internet to determine how to locate the serial number on the UE. Additionally, some devices may not make the serial number accessible to the user, such as in an IoT device UE, which may lack a graphical user interface (GUI), which may make it difficult to locate the serial number and/or provide the serial number to the MNO application.

Some implementations described herein enable provisioning of a UE using an MNO application. For example, an MNO application, operating on a UE, may generate an activation code including an authentication identifier, such as an ES9+ interface fully qualified domain name (FQDN), associated with an MNO and use the FQDN to capture an EID provided by the UE. In this case, the UE may communicate with an MNO management system using the FQDN and provide an EID of the UE and a corresponding unique identifier of the activation code and the FQDN. In this case, an EID is pushed back to the MNO application, thereby providing the MNO application with the EID to allow the MNO application to proceed with provisioning of the UE and enabling the UE to obtain network service from the MNO.

Figure 1B:
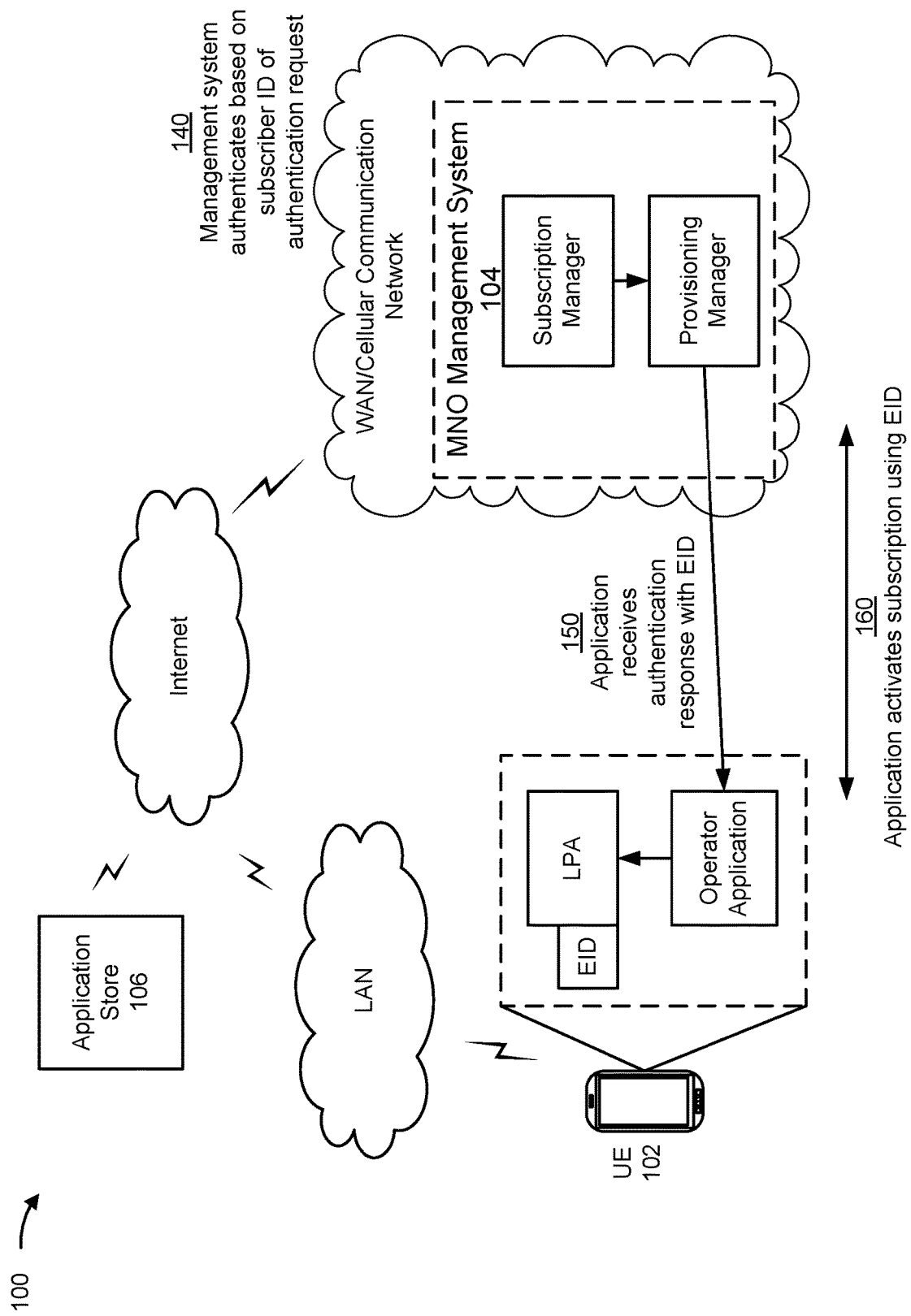

FIGS. 1A-1B are diagrams of an example 100 associated with obtaining an electronic identification of a UE for activation of a subscription. As shown in FIGS. 1A-1B, example 100 includes a UE 102, an MNO management system 104, and an application store 106. In some implementations, an operating system (OS) of UE 102 may be configured to prevent an MNO application from locally accessing an EID of UE 102. For example, the OS may maintain a firewall between third party applications and the identification information associated with UE 102. This identification information may not be locally accessible as a file or data structure that maintains the identification information may not be readable by the third party application (but may be transmittable to another device, as described herein).

In some implementations, the UE 102 may include a local profile assistant (LPA) (e.g., in an eUICC of UE 102 or another part of UE 102), which is configured to provide a local profile download (LPD), a local discover service (LDS), or a local user interface (LUI), among other examples. When located within UE 102, the LPA, the LPD, the LDS, and the LUI may be referred to specifically as an "LPAd," "LPDd," "LUId," and "LDSd," respectively. When located within an eUICC, the LPA, the LPD, the LDS, and the LUI may be referred to specifically as an "LPAe," "LPDe," "LUIe," and "LDSe," respectively.

As further shown in FIG. 1A, and by reference number 110, UE 102 may obtain and install an MNO application. For example, UE 102 may obtain the MNO application from application store 106, such as via a wide area network (WAN), a local area network (LAN), and/or the Internet, and may install the MNO application. In some aspects, UE 102 may obtain the MNO application to obtain service for a particular network to which UE 102 does not have access when obtaining the MNO application. For example, UE 102 may use first service on a first network. The first network may be a Wi-Fi network or other non-cellular network. Additionally, or alternatively, the first network may be a cellular type of network. In some implementations, the first network may be provided by a first MNO to access application store 106 and obtain an MNO application associated with a second MNO. In this case, UE 102 may use the MNO application to communicate with MNO management system 104 to obtain second service on a second network provided by a second MNO (e.g., that is operating MNO management system 104). In some aspects, the respective networks may be different networks. For example, UE 102 may use a LAN (e.g., the first network) to obtain the MNO application, which may enable UE 102 to connect to a WAN (e.g., the second network).

As further shown in FIG. 1A, and by reference number 120, UE 102, using the MNO application, may obtain a detection code with an FQDN of a subscription manager. For example, the MNO application may provide UE 102 with the detection code, which may be identified using an API of the LPA of UE 102. In some aspects, UE 102 may generate the detection code to enable transmission of an authentication request with an EID of UE 102. For example, the MNO application may use an API of the LPA to cause the LPA to deposit an EID detection activation code in UE 102 to trigger transmission of the authentication request with the EID, thereby enabling UE 102 to provide the EID externally, based on a local trigger, even when UE 102 includes an OS that prevents a local application from accessing the EID, as described above. The detection code may include information associated with a subscription manager of the MNO, such as a subscription manager of MNO management system 104. For example, the detection code may include a subscriber identification (e.g., a "Matching_ID" parameter) or an authentication identifier (e.g., an FQDN). In this case, based on obtaining the detection code, UE 102 may generate an authentication request, which includes the EID of UE 102, that will be provided to cause a subscription manager of MNO management system 104 to provide the EID back to UE 102.

As further shown in FIG. 1A, and by reference number 130, UE 102 may provide an authentication request with an EID using the FQDN. For example, UE 102 may transmit the authentication request to MNO management system 104, such as via a WAN, a LAN, and/or the Internet. UE 102 may transmit the authentication request with an authentication identifier, an EID, or a subscriber identifier, among other examples. For example, UE 102 may communicate with an SM-DP+ platform (or another platform that supports, for example, an ES9+ interface application programming interface (API) call in connection with the Global System for Mobile Communications Association (GSMA) specification) associated with the subscription manager of MNO management system to provide the EID based on generating the authentication request. UE 102 may provide the authentication request with a particular format, such as a predefined format or structure configured for parsing by an SM-DP+ platform or another similar platform implemented by the subscription manager. In this way, the MNO application uses the API of UE 102 or an LPA thereof to trigger UE 102 to provide its EID externally to MNO management system 104, thereby enabling MNO management system 104 to redirect the EID to the MNO application. In this case, the MNO application enables acquisition of the EID even when UE 102 prevents local access to the EID and without a received user input to provide, for example, a serial number of UE 102.

As further shown in FIG. 1B, and by reference number 140, MNO management system 104 may authenticate the authentication request based on the subscriber identifier of the authentication request. For example, MNO management system 104 may parse the authentication request, the Matching_ID thereof, the EID thereof, among other examples to extract the EID.

As further shown in FIG. 1B, and by reference number 150, UE 102 may receive an authentication response that includes the EID and is designated for receipt by the MNO application. For example, MNO management system 104 may provide an authentication response to the MNO application operating on UE 102, such as via a WAN, a LAN, and/or the Internet. MNO management system 104 may provide an ES2+ callback to a backend system of an MNO, implemented by the provisioning manager of MNO management system 104, which may be a push trigger to cause transmission of the EID, with the Matching_ID parameter to the MNO application operating on UE 102. In this way, MNO management system 104 enables redirect of the EID to the MNO application for use locally on UE 102.

As further shown in FIG. 1B, and by reference number 160, UE 102 may perform an action, such as communicating with MNO management system 104 to activate a subscription using the EID. For example, UE 102 may, using the MNO application, obtain a reserved profile (from an SM-DP+ implemented by MNO management system 104) to acquire service using a network provided by the MNO operating MNO management system 104. In this case, UE 102 may use the EID to identify an eSIM, request reservation of the eSIM and an ICCID from MNO management system 104 (which may exchange information between the provisioning manager and the subscription manager to request and reserve the eSIM ICCID), and receive a profile download activation code from MNO management system 104 as a response to the eSIM ICCID reservation request. Using the download activation code, the MNO application may use an API of the LPA of UE 102 to cause UE 102 to transmit an ES9+ authentication with the EID and receive a binary eSIM for installation of UE 102, thereby enabling UE 102 to obtain access to service provided by the MNO.

In this way, UE 102 and an MNO application thereof use an API of an LPA of UE 102 to cause UE 102 to send an EID externally to MNO management system 104 for redirect back to the MNO application operating locally on UE 102, thereby obviating an UE 102 OS restriction on local access to the EID. In this way, UE 102 enables acquisition of service from an MNO without manual identification of a serial number of UE 102, which may be time-consuming, waste resources, and/or be impractical for a user of UE 102.

As indicated above, FIGS. 1A-1B are provided as an example. Other examples may differ from what is described with regard to FIGS. 1A-1B. The number and arrangement of devices shown in FIGS. 1A-1B are provided as an example. In practice, there may be additional devices, fewer devices, different devices, or differently arranged devices than those shown in FIGS. 1A-1B. Furthermore, two or more devices shown in FIGS. 1A-1B may be implemented within a single device, or a single device shown in FIGS. 1A-1B may be implemented as multiple, distributed devices. Additionally, or alternatively, a set of devices (e.g., one or more devices) shown in FIGS. 1A-1B may perform one or more functions described as being performed by another set of devices shown in FIGS. 1A-1B.

Figure 2:
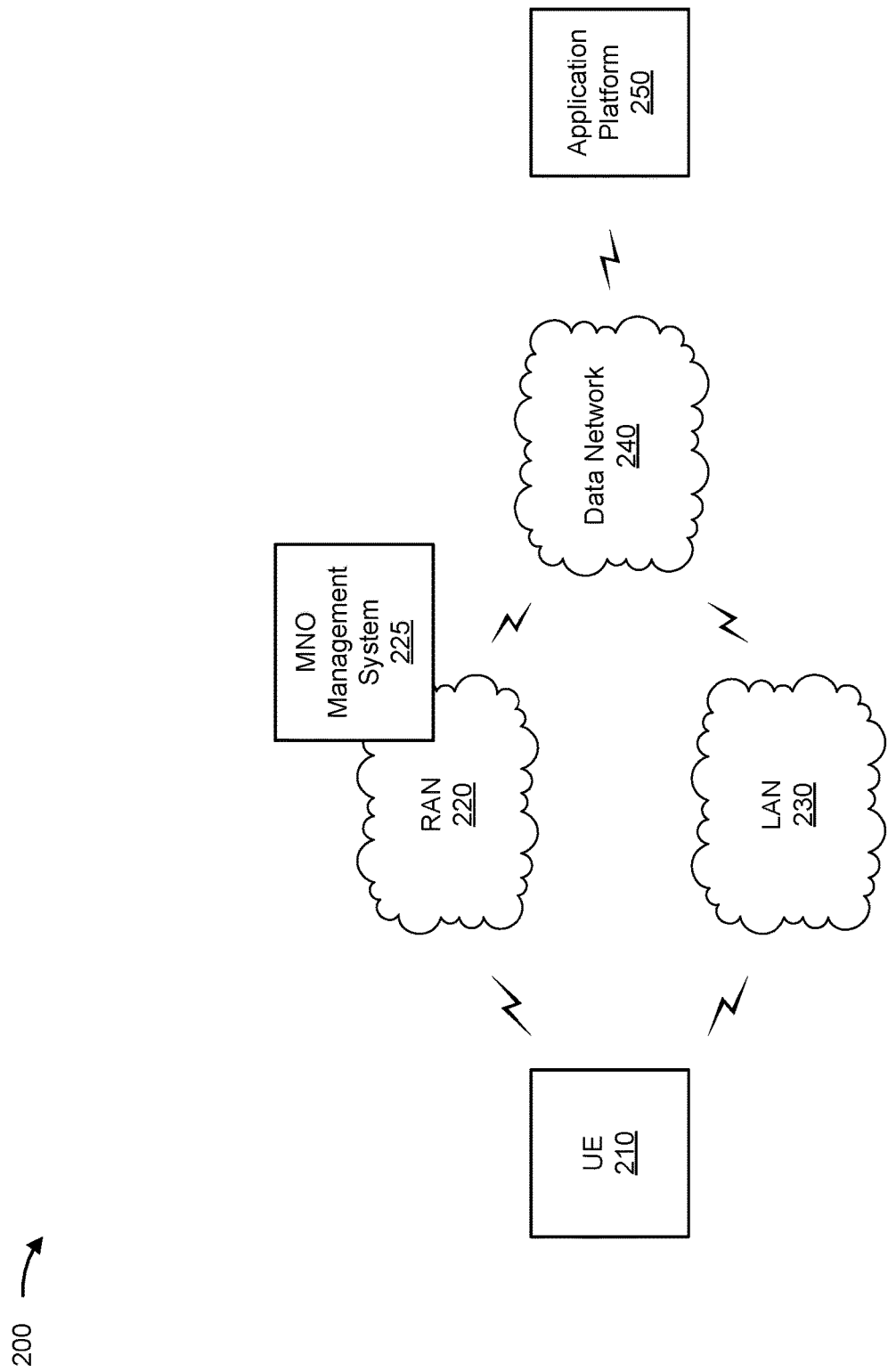
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a UE 210, a RAN 220, an MNO management system 225, a LAN 230, a data network 240, and an application platform 250. Devices of environment 200 may interconnect via wired connections, wireless connections, or a combination of wired and wireless connections.

UE 210 includes one or more devices capable of communicating with a base station and/or a network (e.g., data network 240). For example, UE 210 can include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, user equipment, and/or a similar device. UE 210 can be capable of communicating using uplink (e.g., UE to base station) communications, downlink (e.g., base station to UE) communications, and/or sidelink (e.g., UE-to-UE) communications. In some implementations, UE 210 can include a machine-type communication (MTC) UE, such as an evolved or enhanced MTC (eMTC) UE. In some implementations, UE 210 can include an Internet of Things (IoT) UE, such as a narrowband IoT (NB-IoT) UE and/or the like.

RAN 220 includes a base station and be operatively connected, via a wired and/or wireless connection, to a core network. RAN 220 can facilitate communication sessions between UEs and data network 240 by communicating application-specific data between RAN 220 and the core network. Data network 240 can include various types of data networks, such as the Internet, a third-party services network, an operator services network, a private network, a wide area network, and/or the like.

MNO management system 225 includes one or more devices capable of providing access to an MNO. For example, MNO management system 225 may include one or more servers implementing a subscription manager and a provisioning manager. The subscription manager may be an SM-DP+ function with an ES9+ interface and the provisioning manager may be an MNO backend with an ES2+ interface. The MNO management system 225 may include a communication device and/or a computing device. For example, the MNO management system 225 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. In some implementations, MNO management system 225 may be located in and/or implement at least a portion of data network 240, such as a WAN or a cellular communication network of data network 240. The MNO management system 225 may communicate with one or more other devices of environment 200, as described elsewhere herein.

LAN 230 includes one or more wired and/or wireless data networks. For example, LAN 230 may be a first network through which UE 210 may access application platform 250 to obtain an MNO application (with which UE 210 may then obtain access to a second network, such as a WAN, associated with MNO management system 225 of data network 240.

Data network 240 includes one or more wired and/or wireless data networks. For example, data network 240 can include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or the like, and/or a combination of these or other types of networks.

Application platform 250 includes one or more devices capable of receiving, generating, storing, processing, providing, and/or routing information associated with providing applications for download, as described elsewhere herein. The application platform 250 may include a communication device and/or a computing device. For example, the application platform 250 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. The application platform 250 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
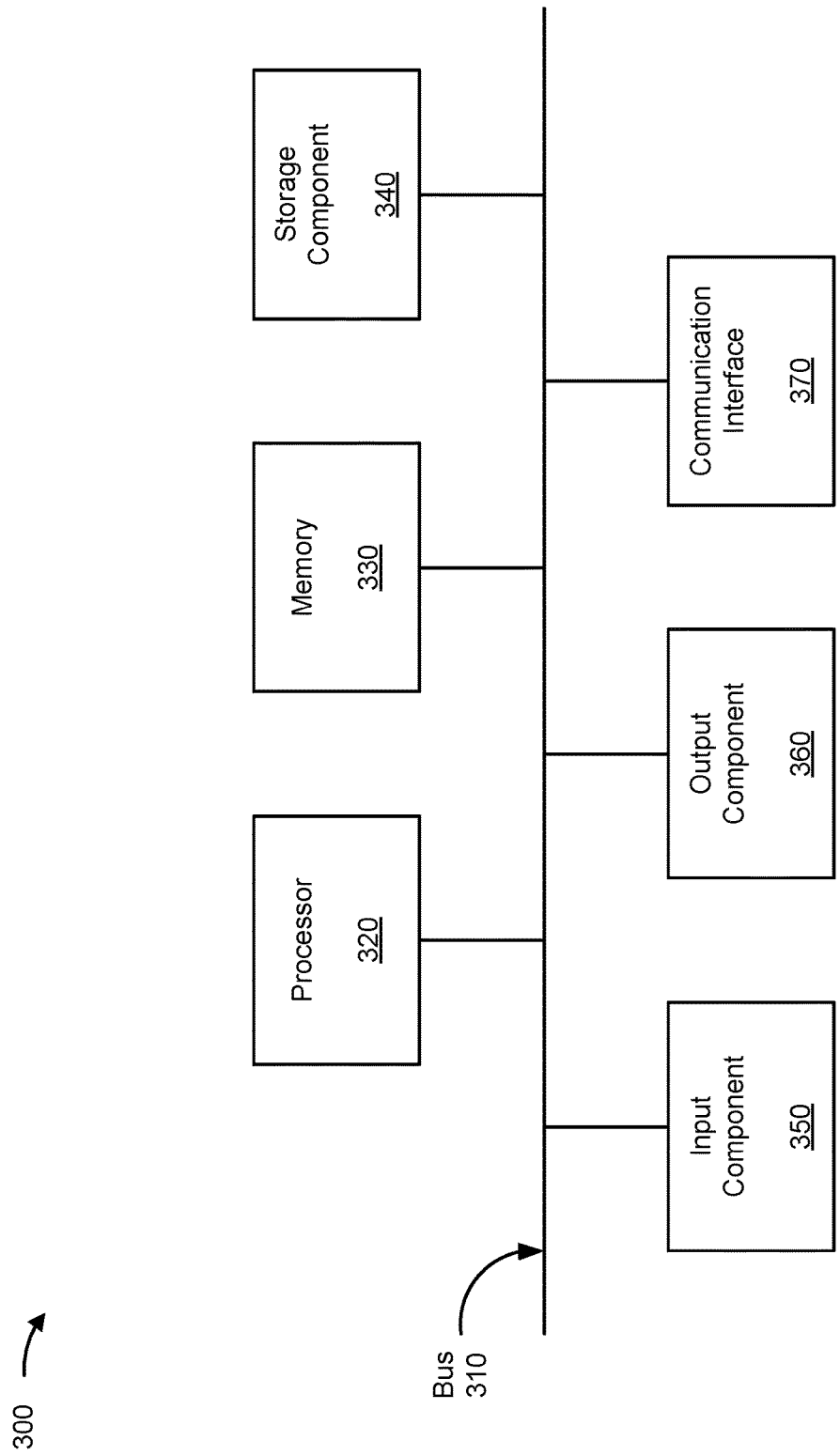
FIG. 3 is a diagram of example components of one or more devices of FIG. 2.

FIG. 3 is a diagram of example components of a device 300, which may correspond to UE 210, MNO management system 225, and/or application platform 250. In some implementations, UE 210, MNO management system 225, and/or application platform 250 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, an actuator, and/or the like. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, an antenna, and/or the like.

Device 300 may perform one or more processes described herein. For example, a non-transitory computer-readable medium (e.g., memory 330 and/or storage component 340) may store a set of instructions (e.g., one or more instructions, code, software code, program code, and/or the like) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
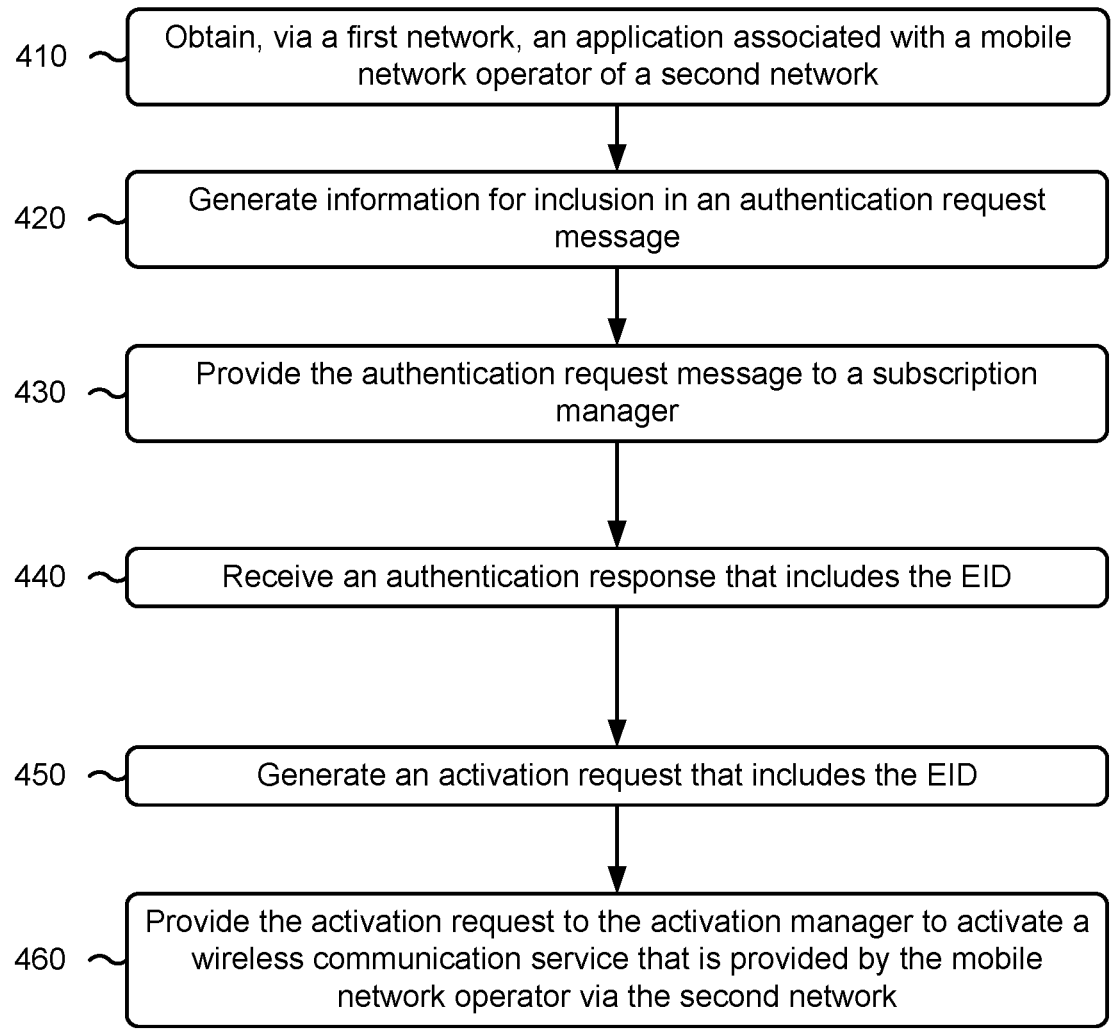
FIG. 4 is a flowchart of an example process relating to obtaining an electronic identification of a user equipment for activation of a subscription.

FIG. 4 is a flowchart of an example process 400 associated with obtaining an electronic identification of a user equipment for activation of a subscription. In some implementations, one or more process blocks of FIG. 4 may be performed by an UE (e.g., UE 210). In some implementations, one or more process blocks of FIG. 4 may be performed by another device or a group of devices separate from or including the UE, such as an MNO management system (e.g., MNO management system 225) or an application (e.g., application platform 250), among other examples. Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include obtaining, via a first network, an application associated with a mobile network operator of a second network (block 410). For example, the UE may obtain, via a first network, an application associated with a mobile network operator of a second network, as described above. The first network may be a local area network (LAN) and the second network may be a cellular communication network. In some implementations, the first network may be a Wi-Fi network and the second network may be a cellular network. For example, the UE may obtain, via a Wi-Fi network, an application to enable access to a cellular network associated with a particular mobile network operator.

As further shown in FIG. 4, process 400 may include generating information for inclusion in an authentication request message (block 420). For example, the UE may generate, based on a detection code of the application, an authentication request to convey the detection code (e.g., an EID detection code), wherein the detection code includes a subscriber identification and an authentication identifier associated with a subscription manager of the mobile network operator, as described above. In some implementations, the detection code includes a subscriber identification and an authentication identifier associated with a subscription manager of the mobile network operator. In some implementations, the subscription manager includes a subscription manager and data preparation (SM-DP) function of a management system of the mobile network operator. The authentication identifier may be a fully qualified domain name (FQDN) associated with the mobile network operator The detection code may be obtained via an application programming interface associated with a local profile assistant of the UE. An operating system of the UE is configured to prevent the application from locally accessing the EID; accordingly, the UE may generate the authentication request to provide the EID externally, as described above.

As further shown in FIG. 4, process 400 may include providing the authentication request message to a subscription manager (block 430). For example, the UE may provide, based on the authenticator identifier, the authentication request to the subscription manager, as described above. In this case, the authentication request is configured to cause the subscription manager to instruct the activation manager to return the authentication response to enable the application to obtain the EID.

As further shown in FIG. 4, process 400 may include receiving an authentication response that includes the EID (block 440). For example, the UE may receive, from an activation manager of the mobile network operator, an authentication response that includes the EID, as described above. In some implementations, the UE may receive the authentication response that includes the EID based on providing the authentication request message that includes the EID detection code, as described above. In this case, the UE may provide the authentication response to the application to enable the application to access the EID, as described above.

As further shown in FIG. 4, process 400 may include generating an activation request that includes the EID (block 450). For example, the UE may generate, based on an activation code of the application, an activation request that includes the EID, as described above.

As further shown in FIG. 4, process 400 may include providing the activation request to the activation manager to activate a wireless communication service that is provided by the mobile network operator via the second network (block 460). For example, the UE may provide the activation request to the activation manager to activate a wireless communication service that is provided by the mobile network operator via the second network, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a user equipment and after providing a detection code associated with an application, from a mobile network operator, an authentication response that includes an electronic identification (EID);
   generating, by the user equipment and based on the authentication response, an activation request that includes the EID; and
   performing, by the user equipment, an action associated with the activation request to activate a wireless communication service provided by the mobile network operator.

2. The method of claim 1, further comprising:
   providing the authentication response to the application to enable the application to access the EID; and
   wherein generating the activation request comprises:
   generating the activation request that includes the EID based on an activation code of the application.

3. The method of claim 1, further comprising:
   obtaining, via a first network, the application; and
   wherein performing the action associated with the activation request to activate the wireless communication service comprises:
   providing the activation request to an activation manager to activate the wireless communication service that is provided by the mobile network operator via a second network.

4. The method of claim 1, further comprising:
   providing an authentication request,
   wherein the authentication request is configured to cause a subscription manager to instruct an activation manager to return the authentication response.

5. The method of claim 1, further comprising:
   providing an authentication request, including the detection code, to a subscription manager of the mobile network operator,
   wherein the detection code is configured to cause a local profile assistant of the user equipment to generate and provide the authentication request.

6. The method of claim 1, further comprising:
obtaining a reserved profile to acquire service using a network provided by the mobile network operator.

7. The method of claim 1, wherein the EID comprises at least one of:
an embedded universal integrated circuit card (eUICC) identification;
an international mobile equipment identity (IMEI); or an international mobile subscriber identity (IMSI).

8. A user equipment, comprising:
one or more processors configured to:
receive, from a mobile network operator and after providing a detection code associated with an application, an authentication response that includes an electronic identification (EID);
generate, based on the authentication response, an activation request that includes the EID; and
perform an action associated with the activation request to activate a wireless communication service provided by the mobile network operator.

9. The user equipment of claim 8, wherein the one or more processors are further configured to:
provide the authentication response to the application to enable the application to access the EID; and
wherein the one or more processors, to generate the activation request that includes the EID, are to:
generate the activation request that includes the EID based on an activation code of the application.

10. The user equipment of claim 8, wherein the one or more processors are further configured to:
obtain, via a first network, the application; and
wherein the one or more processors, to perform the action associated with the activation request to activate the wireless communication service, are to:
provide the activation request to an activation manager to activate the wireless communication service.

11. The user equipment of claim 8, wherein the one or more processors are further configured to:
provide an authentication request,
wherein the authentication request is configured to cause a subscription manager to instruct an activation manager to return the authentication response.

12. The user equipment of claim 8, wherein the one or more processors are further configured to:
provide an authentication request, including the detection code, to a subscription manager of the mobile network operator,
wherein the detection code is configured to cause a local profile assistant of the user equipment to generate and provide the authentication request.

13. The user equipment of claim 8, wherein the one or more processors are further configured to:
obtain a reserved profile to acquire service using a network provided by the mobile network operator.

14. The user equipment of claim 8, wherein the EID comprises an embedded universal integrated circuit card (eUICC) identification.

15. A non-transitory computer-readable medium storing a set of instructions, the set of instructions comprising:
one or more instructions that, when executed by one or more processors of a user equipment, cause the user equipment to:
receive, from a mobile network operator and after providing a detection code associated with an application, an authentication response that includes an electronic identification (EID);
generate, based on the authentication response, an activation request that includes the EID; and
perform an action associated with the activation request to activate a wireless communication service provided by the mobile network operator.

16. The non-transitory computer-readable medium of claim 15, wherein the one or more instructions, when executed by the one or more processors, further cause the one or more processors to:
provide the authentication response to the application to enable the application to access the EID; and
wherein the one or more instructions, that cause the one or more processors to generate the activation request that includes the EID, cause the one or more processors to:
generate the activation request that includes the EID based on an activation code of the application.

17. The non-transitory computer-readable medium of claim 15, wherein the one or more instructions, when executed by the one or more processors, further cause the one or more processors to:
obtain, via a first network, the application; and
wherein the one or more instructions, that cause the one or more processors to perform the action associated with the activation request to activate the wireless communication service, cause the one or more processors to:
provide the activation request to an activation manager to activate the wireless communication service.

18. The non-transitory computer-readable medium of claim 15, wherein the one or more instructions, when executed by the one or more processors, further cause the one or more processors to:
provide an authentication request,
wherein the authentication request is configured to cause a subscription manager to instruct an activation manager to return the authentication response.

19. The non-transitory computer-readable medium of claim 15, wherein the one or more instructions, when executed by the one or more processors, further cause the one or more processors to:
provide an authentication request, including the detection code, to a subscription manager of the mobile network operator,
wherein the detection code is configured to cause a local profile assistant of the user equipment to generate and provide the authentication request.

20. The non-transitory computer-readable medium of claim 15, wherein the one or more instructions, when executed by the one or more processors, further cause the one or more processors to:
obtain a reserved profile to acquire service using a network provided by the mobile network operator.

* * * * *